United States Patent [19]

Tsuzura et al.

[11] 4,222,424
[45] Sep. 16, 1980

[54] LUG TIRES WITH UNIFORM BASE RUBBER GAUGE

[75] Inventors: Junichi Tsuzura, Urawa; Yukio Kojima, Kodaira, both of Japan

[73] Assignee: Bridgestone Tire Company Limited, Tokyo, Japan

[21] Appl. No.: 970,076

[22] Filed: Dec. 14, 1978

[30] Foreign Application Priority Data

Dec. 28, 1977 [JP] Japan ................................ 52-157440

[51] Int. Cl.² .................... B60C 11/00; B60C 13/00; B29H 5/02; B29H 17/02
[52] U.S. Cl. .......................... 152/209 B; 152/330 R; 152/352 R; 156/128 R; 264/315; 264/326
[58] Field of Search ........... 152/209 R, 209 B, 209 D, 152/209 A, 209 NT, 209 WT, 209 D, 352 R, 352 A, 353 R, 353 C, 353 G, DIG. 3; 156/128 R; 264/315, 326

[56] References Cited

U.S. PATENT DOCUMENTS 3,457,981  7/1969  Verdier ................................ 152/352
3,811,488  5/1974  Duncan ............................ 152/209 R

FOREIGN PATENT DOCUMENTS 163051  5/1949  Australia ............................... 156/128 R Primary Examiner—John T. Goolkasian
Assistant Examiner—L. E. Rodgers
Attorney, Agent, or Firm—Sughrue, Rothwell, Mion, Zinn and Macpeak

[57] ABSTRACT

A lug tire for agricultural machines and constructional vehicles provided with at least one discontinuous portion formed by decreasing a thickness of a base rubber at both end regions of a tread and arranged along the circumferential direction of the tire.

6 Claims, 6 Drawing Figures

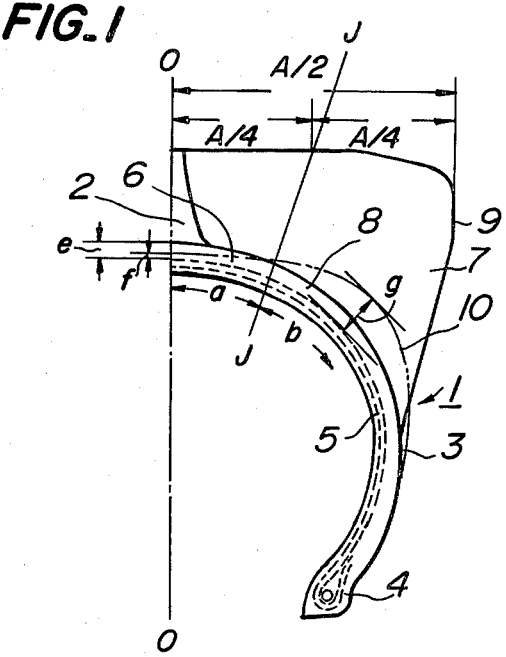
FIG._1
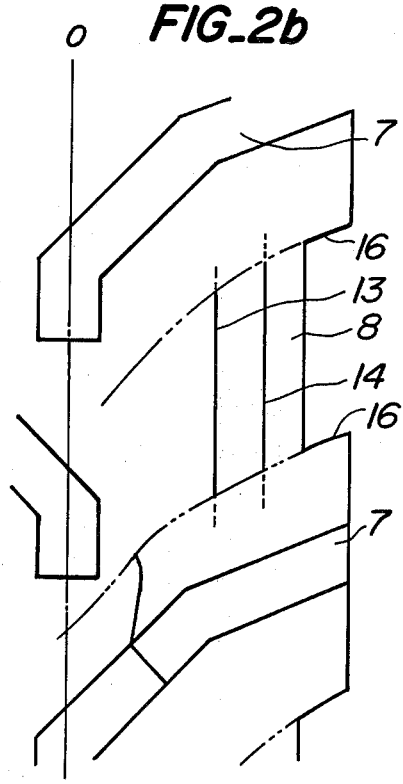
FIG._2b
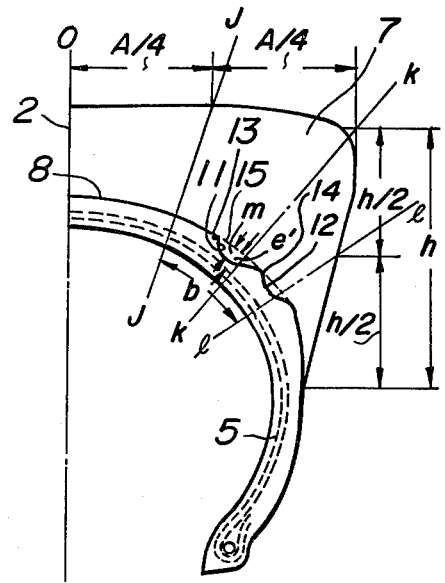
FIG._2a

LUG TIRES WITH UNIFORM BASE RUBBER GAUGE

BACKGROUND OF THE INVENTION

1. Field of the Invention

This invention relates to tires for agricultural machines, construction and mining vehicles and more particularly to a lug tire provided with lugs projected from a tread surface and laid in herringbone pattern.

2. Description of the Prior Art

The tire for agricultural machines and the like serves to effect a traction operation on off road contrary to a tire for passenger cars or trucks and buses. As a result, the tire mounted on a driving wheel of the vehicles is provided with bar-shaped lugs projected from the tread center portion and extending toward both ends of the tread, the lugs being spaced apart from each other in the circumferential direction of the tire by transverse grooves. The height of the lug of the tire for agricultural machines and the like is considerably higher than that of the tire for trucks, buses or the like.

As well known in the art, in the case of manufacturing the tire for agricultural machines and the like, a carcass having a necessary construction is formed by laminating cord layers on a cylindrical former and to both end portions of the cord layers are secured bead wire rings. Subsequently, a tread rubber and side rubber each having a uniform thickness in the circumferential direction are superimposed one upon the other about the carcass to form a cylindrical green tire. The cylindrical green tire thus formed is put in a metal mold provided at its inner surface with indentations corresponding to outer shape of the tire and subjected to a vulcanization molding operation at a high temperature under pressure to provide a highly resilient tire.

In the case of the tire for the agricultural machines and the like belonging to the above described high lug tire, the recesses of the mold corresponding to the lugs are especially deep. As a result, the above mentioned tread crude rubber having a uniform thickness of the green tire is flowed into these recesses when the green tire is subjected to the vulcanization molding operation to form the lug portions and groove portions.

It is usual that the height of the lug of the tire is increased from the tread center portion to both end portions of the tire. It is a matter of coures, therefore, that the recess in the mold is correspondingly deep and wide at both the end portions of the tire.

The cylindrical green tire is urged against the inner wall of the mold and toroidally deformed by means of n inflated flexible bladder and vulcanized by steam introduced into the bladder. In the initial vulcanization and shaping step, the flexible bladder functions to apply its pressure in the first place to the tread center portion of the tire and subsequently to both the end portions of the tread owing to the tire shape and mold mechanism. As a result, the tread rubber in the green tire becomes heated and softened and a large amount of softened rubber flows from the tread center portion to the both end portions thereof. As a result, the skid base rubber corresponding to the groove base rubber becomes thicker than a required thickness at both the tread end portions and tends to be thinner than the required thickness at the tread center portion. It is, however, necessary to manufacture a tire which is not defective in ability and manufacturing cost.

SUMMARY OF THE INVENTION

An object of the invention, therefore, is to provide a lug tire which can eliminate the above mentioned drawback which has been encountered with the prior art techniques.

A feature of the invention is the provision, in a lug tire comprising a toroidal carcass, a tread disposed on a crown portion of the carcass, side portions extending from both ends of the tread to both sides of the tire and a pair of bead portions located at the both ends of the side portion. The tread is composed of rubber lugs spaced apart from each other by a given distance in the circumferential direction of the tire and a base rubber is interposed between the rubber lugs, any two adjacent lugs being inclined in opposite directions with respect to the equatorial plane of the tire. At least one discontinuous portion is formed by decreasing the thickness of the base rubber at both end regions of said tread and arranged along the circumferential direction of the tire.

Further objects and advantages of the invention will be fully understood from the following detailed description with reference to the accompanying drawings, in which:

BRIEF DESCRIPTION OF THE DRAWINGS

FIG. 1 is a cross-sectional view of right-half of a conventional lug tire for agricultural machines;

FIG. 2a is a cross-sectional view of right-half of one embodiment of a lug tire according to the invention;

FIG. 2b is a partial plan view of the tire shown in FIG. 2a;

DETAILED DESCRIPTION OF THE PREFERRED EMBODIMENTS

Figure 3:
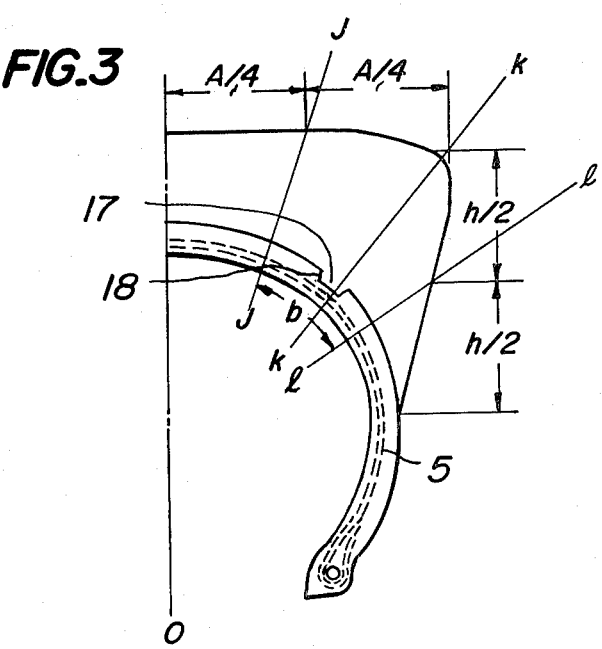
FIG. 3 is a cross-sectional view of right-half of another embodiment of a lug-tire according to the invention.

FIG. 1 is a cross-sectional view of right-half of a conventional lug tire for agricultural machines. FIG. 1 shows a non-uniform condition of a skid base gauge caused by the above mentioned phenomenon.

Referring to FIG. 1, reference numeral 1 designates a tire provided at its center portion with a tread 2 which extends through side portions 3, 3 toward bead portions 4, 4. Between these bead portions 4, 4 is arranged a toroidal carcass 5 to reinforce the tire as a whole. About a crown 6 of the carcass is superimposed the tread 2 composed of a number of lugs 7 arranged in herringbone pattern and a base rubber 8 interposed between two adjacent lugs. The lug 7 of the tire for agricultural machines is higher in height than the lug of the tire for trucks and buses. The height of the lug 7 is increased from the equatorial plane O—O of the tire toward the end 9 of the lug 7. In such a high lug tire, the rubber for forming the lug violently flows at the beginning of vulcanization and the rubber as a whole simultaneously flows from the tread center portion toward both ends of the tread. The base rubber gauge e which is a value aimed at to be designed is equal from a tread end region b to a tread center region a, the regions a and b being defined by a normal line J—J drawn through a point located on the tread and distant apart from the equatorial plane O—O by A/4 (where A is a tread width) and perpendicular to the carcass contour.

In FIG. 1, dot-dash lines 10 show the contour of the tire product. The base rubber gauge f at the equatorial plane O—O becomes considerably smaller than the design value, eventually exposing the reinforcing cord of the carcass 5, while the maximum value g of the base rubber gauge in the region b often becomes 4 times larger than the above mentioned design value e.

As above described, if the base rubber gauge e is decreased in the tread center region, it is impossible to expect the carcass reinforcing effect of the base rubber 8. In addition, the excessively large gauge g in the region b hinders the workability of the tire in fields or the like. Particularly, in the tire for agricultural machines, the stress is concentrated into the base of the lug, thereby inducing a crack failure.

In order to eliminate such drawback, it has heretofore been proposed to use a bladder whose gauge is large at the cross-sectional center portion thereof and is gradually decreased toward both sides thereof instead of a conventional bladder whose gauge is uniform as a whole for the purpose of applying a uniform pressure in the crosssectional direction of the tread from the beginning of applying the pressure when the inner side of the tire in the mold is subjected to the pressure by means of the bladder. The conventional bladder has a usual life that can enable it to withstand about 500 vulcanizations. But, the proposed bladder becomes unable when it is subjected to about 100 vulcanizations due to bending fatigue produced when the bladder is inserted into and removed from a tire cavity everytime the tire is vulcanized. The use of such proposed bladder, therefore, is extremely unfavorable with regard to the manufacturing cost of the tire.

A lug tire according to the invention which is constructed to eliminate the above-described drawback will now be described with FIGS. 2a and 2b.

FIG. 2a is a cross-sectional view of right-half of one embodiment of a tire according to the invention and FIG. 2b is its partial plan view.

In the tire shown in FIGS. 2a and 2b, in the tread end region b with respect to the normal line J—J as described with reference to FIG. 1, provision is made of two step-shaped discontinuous portions 11 and 12 in the base rubber 8. These discontinuous portions 11 and 12 are provided at their sides facing the equatorial plane O—O with side walls 13 and 14, respectively, from which the discontinuous portions become suddenly deep and then gradually shallow toward the outside of the tire. These discontinuous portions 11 and 12 are formed by projections at the inner surface of the mold, and as a result, the base rubber 8 is prevented from flowing sidewardly by the inclined portions of the mold corresponding to the sidewalls 13 and 14 when the tire is vulcanized. Thus, it is possible to prevent the decrease of the base rubber gauge at the equatorial plane O—O shown in FIG. 1 and hence the increase of the base rubber gauge in the region b.

At least one of the above described discontinuous portions of the base rubber must be arranged in a region where the base rubber gauge e becomes excessively large, for example, in a range b located between the J—J line and a normal line l—l drawn from a h/2 point which is one-half of a height h of the side end portion of the lug 7 and perpendicular to the contour of the carcass 5. It is preferable to arrange at least one of the discontinuous portions of the base rubber at a position near a normal line k—k drawn through a point where a basic line defining the tread width and a basic line defining the lug height cross with each other and perpendicular to the contour of the carcass or at a position displaced from this position toward the J—J line.

It is preferable that the depth of the discontinuous portion, that is, a depth m from an imaginary contour line 15 of the base rubber surface to the deepest point of the discontinuous portion is within a range between 25% and 80% of a base rubber gauge e' measured from the above mentioned imaginary contour line 15.

FIG. 2b shows the discontinuous portions 11, 12 arranged in the circumferential direction of the tire by those positions of the sidewalls 13, 14 which connect the base lines 16, 16 from which the lugs 7, 7 are raised up. FIG. 2b shows one region of the discontinuous portions formed between two adjacent lugs 7, 7 for the sake of simplifying the drawing. It is a matter of course that the discontinuous portions may similarly be arranged on that base rubber 8 which is located between any other lugs 7, 7 in the circumferential direction of the tire.

In addition, the discontinuous portions 11, 12 may be arranged along a zigzag path or may be slightly inclined to the circumferential direction of the tire relative to the arrangement of lugs.

FIG. 3 is a cross-sectional view of the right-half of another embodiment of a tire according to the invention. In the present embodiment, a discontinuous portion 17 is composed of a longitudinal groove located at a position slightly displaced from the normal line k—k drawn perpendicular to the carcass 5 in the tread end region b toward the equatorial plane O—O. The longitudinal groove is provided with a sidewall 18 extending along a normal line which is substantially perpendicular to the contour of the carcass 5. Such longitudinal groove 17 is different in construction from the discontinuous portions 11 and 12 shown in FIGS. 2a and 2b. The effect of the longitudinal groove 17, however, is the same as that of the discontinuous portions 11 and 12 shown in FIGS. 2a and 2b.

Experimental tests for comparing a 8.3/8-22 4PR tire for agricultural tractor to which was applied the invention with the conventional tire have demonstrated the following result.

In the experimental tests, the discontinuous portions of the tire according to the invention were of step-shaped ones as shown in FIG. 2a and one of which was arranged at that position which was crossed by the normal line k—k.

Figure 4:
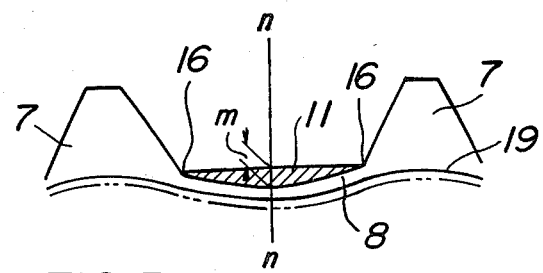
FIG. 4 is a partial cross-sectional view of a discontinuous portion of a tire tested according to the invention.

FIG. 4 shows a cross-sectional view of the tire shown in FIG. 2a taken on the normal line k—k and viewed in the circumferential direction of the tire. As seen from FIG. 4, the height of the lug 7 of this kind of tire is considerably higher in proportion to the number of carcass plies composed of 2 nylon cord plies, so that the contour of the outer surface of the carcass becomes more or less wavy in the circumrerential direction thereof. As a result, the discontinuous portion is made arcuate in section in its circumferential direction such that the depth at the base line 16 of the lug 7 is zero and the depth at the center position n—n is the deepest as shown in FIG. 4.

The deepest depth m of the discontinuous portion is made 55% of the base rubber gauge e' located at the deepest depth position (refer of FIG. 2a).

Both the tire according to the invention and the conventional tire were mounted on the rim, inflated by applying the internal pressure of 1.6 kg/cm² and then subjected to load of 590 kg (conditions defined by JIS). Under such conditions, the strain in the circumferential direction at the root of the lug of each of these tires was measured at each of the following three positions, i.e. the equatorial plane O—O, normal line J—J distant apart from the equatorial plane O—O by ¼ tread width A and normal line k—k located at the tread end.

Strain values as measured by the above experimental tests are shown in the following Table in which numerical values included in the parentheses are ratios with respect to the conventional tire.

| Position | Equatorial Plane | ¼ Tread Width | Tread End |
|---|---|---|---|
| Tire according to the invention | 1.8 (26) | 0.8 (12) | 0 (0) |
| Conventional tire | 6.9(100) | 6.5(100) | 1.6(100) |

Unit: %

As can be seen from the above Table, the tire according to the invention is capable of reducing the strain subjected to the root of the lug when the lug is subjected to the load to a value which is significantly smaller than that of the conventional tire. This means that the strain produced when the lug is subjected to the force which is in parallel to the ground surface when the tire is in use during tractive operation is also small. As a result, the tire according to the invention can prevent occurrence of cracks at the root of the lug which has often been encountered with the conventional tire.

Both the tire according to the invention and the conventional tire were cut off to measure the base rubber gauge.

Figure 5:
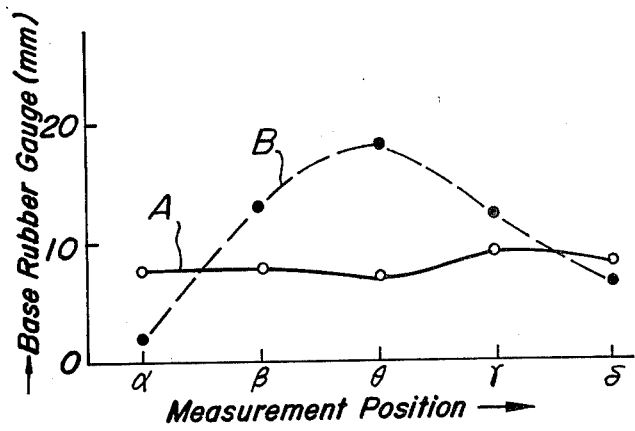
FIG. 5 is a graph showing a base rubber gauge in function of various measurement positions of the tire according to the invention as compared with that of the conventional tire.

FIG. 5 shows the result of measurement. In FIG. 5, the base rubber gauge is plotted as ordinate, while the abscissa represents the measured positions in the transverse cross-sectional direction of the tire. In FIG. 5, $\alpha$ shows the measured position at the equatorial plane O—O, $\beta$ at the normal line J—J drawn at the position distant apart from the equatorial plane O—O by ¼ tread width (A), $\theta$ at the normal line k—k drawn at the tread end position, $\gamma$ at the normal line l—l drawn from the position which corresponds to the ½ the height h of the lug and $\delta$ at the normal line (not shown) drawn from the outside root of the lug (the base line position whose height is h) and perpendicular to the contour of the carcass.

The base rubber gauge of the tire according to the invention shown by a full line curve A is substantially uniformly distributed along all of the measured positions with respect to the base rubber gauge of 8 mm which is the design dimension. On the contrary, the base rubber gauge of the conventional tire shown by dotted lines curve B becomes at the position $\alpha$ smaller by 75% than the base rubber gauge dimension of 8 mm, but becomes at the position $\theta$ larger by 125% than the base rubber gauge of 8 mm.

As stated hereinbefore, the use of the discontinuous portions formed on the base rubber located in the tread end region of the tire according to the invention ensures a uniform base rubber gauge and provides the important advantage that stress becomes distributed over a wide region near the root of the lug when the force is subjected to the lug during running of the tire and hence it is possible to effectively prevent occurrence of cracks that tend to be induced at the root of the lug of the conventional high lug tire, and that the tire can be prevented from unnecessarily increasing its weight, thereby reducing the cost of tire.

What is claimed is:

1. In a lug tire comprising a toroidal carcass, a tread disposed on a crown portion of the carcass, side portions extending from both ends of the tread to both sides of the tire and a pair of bead portions located at the both ends of the side portions, the tread being composed of rubber lugs spaced apart from each other by a given distance in the circumferential direction of the tire and a base rubber interposed between the rubber lugs, any two adjacent lugs being inclined in opposite directions with respect to the equatorial plane of the tire, the improvement comprising at least one discontinuous portion formed during the molding of the tire by decreasing the thickness of said base rubber at both end regions of said tread and arranged along the circumferential direction of the tire, said discontinuous portion having a depth which is in the range of 25% to 80% of a design base rubber gauge whereby the base rubber is otherwise of a substantially uniform gauge.

2. The lug tire according to claim 1, wherein said discontinuous portion is interposed between any two adjacent lugs.

3. The lug tire according to claim 1, wherein said discontinuous portion is composed of a groove.

4. The lug tire according to claim 1, wherein said discontinuous portion is step-shaped.

5. The lug tire according to claim 1, wherein said discontinuous portion is composed of a plurality of discontinuous portions.

6. The lug tire according to claim 1, wherein said discontinuous portion is provided with a sidewall near the tread center and extending along a normal line drawn substantially perpendicular to the cross-sectional configuration of the carcass.

* * * * *